United States Patent
Weng et al.

(10) Patent No.: US 7,504,050 B2
(45) Date of Patent: *Mar. 17, 2009

(54) MODIFICATION OF ELECTRICAL PROPERTIES OF DISPLAY CELLS FOR IMPROVING ELECTROPHORETIC DISPLAY PERFORMANCE

(75) Inventors: Xin Weng, Cotati, CA (US); Yajuan Chen, Fremont, CA (US); Scott C-J Tseng, San Jose, CA (US); Jack Hou, Fremont, CA (US)

(73) Assignee: Sipix Imaging, Inc., Fremont, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/062,245

(22) Filed: Feb. 18, 2005

(65) Prior Publication Data

US 2005/0189524 A1    Sep. 1, 2005

Related U.S. Application Data

(60) Provisional application No. 60/547,317, filed on Feb. 23, 2004.

(51) Int. Cl.
*H01B 1/20* (2006.01)
*G02B 26/00* (2006.01)

(52) U.S. Cl. .................... 252/500; 252/511; 252/502; 252/514; 252/518.1; 359/296; 359/265; 345/107; 445/24

(58) Field of Classification Search .............. 252/500, 252/506, 514, 518.1, 583; 359/296; 245/107; 264/4.1, 4.3; 106/31.16, 1.13, 1.19, 1.23
See application file for complete search history.

(56) References Cited

U.S. PATENT DOCUMENTS

| | | | |
|---|---|---|---|
| 3,612,758 A | | 10/1971 | Evans et al. |
| 4,466,701 A | * | 8/1984 | Ogata et al. .................. 349/153 |
| 4,732,830 A | * | 3/1988 | DiSanto et al. ............... 430/20 |
| 5,908,585 A | * | 6/1999 | Shibuta ...................... 252/506 |
| 5,930,026 A | | 7/1999 | Jacobson et al. |
| 5,961,804 A | | 10/1999 | Jacobson et al. |
| 6,180,224 B1 | * | 1/2001 | Shouji et al. ................. 428/323 |
| 6,211,274 B1 | * | 4/2001 | Tanegashima et al. ....... 524/399 |
| 6,271,823 B1 | | 8/2001 | Grodon, II et al. |
| 6,323,989 B1 | * | 11/2001 | Jacobson et al. ............ 359/296 |
| 6,525,865 B2 | | 2/2003 | Katase |

(Continued)

FOREIGN PATENT DOCUMENTS

EP            0 615 164 A       9/1994

(Continued)

OTHER PUBLICATIONS

Glatkowski, "Carbon Nanotube Based Transparent Conductive Coatings", International SAMPE Symposium and Exhibition, 2003, pp. 2146-2152.*

(Continued)

*Primary Examiner*—Stanley Silverman
*Assistant Examiner*—Kallambella Vijayakumar
(74) *Attorney, Agent, or Firm*—Howrey LLP

(57) ABSTRACT

The invention is directed to a method for improving the performance of electrophoretic displays by modifying the electrical properties of the display cells.

18 Claims, 2 Drawing Sheets

U.S. PATENT DOCUMENTS

| | | | |
|---|---|---|---|
| 6,657,772 B2 * | 12/2003 | Loxley | 359/296 |
| 6,672,921 B1 | 1/2004 | Liang et al. | |
| 6,795,138 B2 | 9/2004 | Liang et al. | |
| 6,831,769 B2 | 12/2004 | Holman et al. | |
| 6,859,302 B2 * | 2/2005 | Liang et al. | 359/296 |
| 6,930,818 B1 | 8/2005 | Liang et al. | |
| 6,933,098 B2 | 8/2005 | Chan-Park et al. | |
| 6,958,849 B2 * | 10/2005 | Chen et al. | 359/296 |
| 7,166,182 B2 * | 1/2007 | Pereira et al. | 156/326 |
| 7,245,414 B2 * | 7/2007 | Liang et al. | 359/265 |
| 2002/0145792 A1 * | 10/2002 | Jacobson et al. | 359/296 |
| 2003/0039022 A1 * | 2/2003 | Liang et al. | 359/296 |
| 2003/0137717 A1 | 7/2003 | Albert et al. | |
| 2005/0007653 A1 | 1/2005 | Honeyman et al. | |
| 2005/0189524 A1 * | 9/2005 | Weng et al. | 252/511 |

FOREIGN PATENT DOCUMENTS

| | | |
|---|---|---|
| EP | 0 980 067 A | 2/2000 |
| WO | WO 01/67170 | 9/2001 |
| WO | WO 02/01281 | 1/2002 |
| WO | WO 02/065215 | 8/2002 |

OTHER PUBLICATIONS

Dupont Ti-pure R-100/R-101, Data Sheet, 2007, pp. 1-4.*

Univar, Data sheet for Ti-pure, 2007, pp. 1-3.*

Allen, K. (Oct. 2003). Electrophoretics Fulfilled. *Emerging Displays Review: Emerging Display Technologies*, Monthly Report—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hopper and Novotny, "An Electrophoretic Display, Its Properties, Model and Addressing", *IEEE Trans. Electr. Devices*, ED-26, No. 8, pp. 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R)LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zhang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

S.A. Van Slyke, et al, Organic Electroluminescent Devices with Improved Stability. *Appl, Phys. Lett.*, 69,2160, 1996.

P.M. Borsenberger and D.S. Weiss, "Photoreceptors: Organic Photoconductors" in "Handbook of Imaging Materials" edited by A.S. Diamond, pp. 379, 1991, Marcel Dekker, Inc. (Unable to obtain year 1991 version; attached is year 2002 version.).

H. Scher and EW Montroll, Anomalous Transit-time Dispersion in Amorphous Solids. *Phys. Rev.*, B12, 2455, 1975.

F. Nuesch, et al, Importance of Indium Tin Oxide Surface Acido Basicity for Charge Injection into Organic Materials Based Light Emitting Diodes. *J. Appl. Phys.*, 87, 7973, 2000.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

* cited by examiner

MODIFICATION OF ELECTRICAL PROPERTIES OF DISPLAY CELLS FOR IMPROVING ELECTROPHORETIC DISPLAY PERFORMANCE

RELATED APPLICATION

This application claims the priorities under 35 USC 119(e) of U.S. Provisional Application No. 60/547,317 filed on Feb. 23, 2004. The whole content of the priority application is incorporated herein by reference in its entirety.

BACKGROUND OF THE INVENTION

1. Field of the Invention

The invention is directed to compositions and methods for improving the performance of electrophoretic displays by modifying the electrical properties of the display cells.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

An improved EPD technology was disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference. The improved EPD cells may be prepared by a lithographic process or by microembossing a layer of a radiation curable composition coated on a first substrate layer to form microcups of well-defined shape, size and aspect ratio. The microcups are then filled with an electrophoretic fluid and sealed with a sealing layer. A second substrate layer is laminated over the filled and sealed microcups, preferably with an adhesive layer.

For all types of electrophoretic displays, image bistability is one of the most important features. However in certain cases, the image bistability may degrade due to reverse bias. The term "reverse bias" is commonly used to describe a voltage induced by the capacitor discharge effect from a dielectric material used in an electrophoretic display. The polarity of the reverse bias is opposite of that of the applied driving voltage and therefore the reverse bias may cause the particles to move in a direction opposite from the intended direction. As a result, the display would have inferior image contrast and bistability. An example of reverse bias is illustrated in FIG. 2. The voltage sensed by the dispersion when the applied voltage drops from +40V to 0V is referred to as the "reverse bias" and its polarity is negative (opposite of the original applied voltage).

The magnitude of the reverse bias is mainly determined by the relative volume (bulk) resistivity of the dielectric material when compared with that of the electrophoretic fluid, the higher the volume resistivity of the dielectric material, the higher the reverse bias.

U.S. Pat. No. 6,525,865 discloses an electrophoretic display wherein resin in which a conductive material (carbon or metallic fiber) is kneaded and contained can be used as a material of a bulkhead or a sealer. According to the document, either the bulkhead or sealer that is made conductive can be used as a common electrode to be paired with pixel electrodes. The conductivity of the bulkhead or sealer in this case is not controlled.

U.S. Pat. No. 6,657,772 discloses that the volume resistivity of an adhesive layer can be decreased by blending a conductive filler into the adhesive composition, however, it also acknowledges that there are great difficulties in adopting this approach to achieve the volume resistivity of about $10^{10}$ ohm cm required for an adhesive layer used in an electrophoretic display. The document further states that the volume resistivity of the conductive filler should not be about two orders of magnitude less than the intended volume resistivity of the final blend and it claims that an adhesive layer has a volume resistivity in the range of about $10^9$ to about $10^{11}$ ohm cm may only be achieved by a mixture of an adhesive material having a volume resistivity of at least about $5 \times 10^{11}$ ohm cm and a filler having a volume resistivity not less than about $10^7$ ohm cm.

Most conductive fillers are not transparent and require tedious grinding or milling to be uniformly dispersed into the display cell structure or other dielectric layers. Aggregation of the filler particles may results in undesirable effects such as poor image uniformity, mottling or sometimes short circuit of the display. In the case of microcup-based EPDs, incorporation of conductive filler particles into the microcup structure or the top-sealing and/or adhesive layer tends to cause problems in the manufacture of the microcups. Defective microcups may be resulted from insufficient or non-uniform degree of photoexposure during a microcup forming process (e.g., microembossing or photolithographic exposure). Moreover, if the particle size of the filler particles is relatively large as compared with the degree of surface roughness or thickness of the layer comprising the particles, damage on the embossing shim or the conductor film such as ITO/PET during embossing may be observed, particularly when the hardness of the conductive filler is higher than that of the shim material or conductor film used.

SUMMARY OF THE INVENTION

The present invention relates to compositions and methods for improving the performance of an electrophoretic display. More specifically, it has been found that the performance of an electrophoretic display may be improved by incorporating a conductive filler having a volume resistivity of less than about $10^4$ ohm cm, preferably about $10^2$ to about $10^3$ ohm cm, into a composition for the formation of display cells. In other words, it has been found that the display cells having an intended volume resistivity of about $10^7$ to $10^{10}$ ohm cm may be achieved by blending a conductive filler having a volume resistivity of less than about $10^4$ ohm cm, preferably about $10^2$ to about $10^3$ ohm cm, into a display cell composition.

The conductive filler is in the form of nanoparticles. The term "nanoparticles", in the context of the present invention, refers to particles having an average primary particle size which is smaller than the range of UV-visible scattering light (about 0.15 to about 0.3 um) or a typical short range of surface roughness (about 0.05 to about 0.1 um) of a plastic film. More specifically, the average size of the primary conductive filler particles suitable for the present invention is in the range of about 5 to about 150 nanometer, preferably about 10 to about 50 nanometer and more preferably about 15 to about 20 nanometer. The term "primary particles", in the context of the present invention, refers to the particles that can be recognized individually by, for example, electronic or optical microscope. The primary particle size, in the context of the present invention, refers to the size of the primary particles before flocculation or coagulation.

The first aspect of the present invention is directed to a composition for the formation of display cells which composition comprises a display cell forming material and a conductive filler in the form of nanoparticles and having a volume resistivity of less than about $10^4$ ohm cm, preferably about $10^2$ to about $10^3$ ohm cm.

The second aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into a composition for the formation of display cells.

The third aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into both a composition for the formation of display cells and a composition for the formation of a dielectric layer.

The fourth aspect of the present invention is directed to an electrophoretic display which comprises display cells formed from a composition comprising a display cell forming material and a conductive filler in the form of nanoparticles and having a volume resistivity of less than about $10^4$ ohm cm, preferably about $10^2$ to about $10^3$ ohm cm.

The fifth aspect of the present invention is directed to an electrophoretic display which comprises display cells formed from a composition comprising a display cell forming material and a conductive filler in the form of nanoparticles and having a volume resistivity of less than about $10^4$ ohm cm, preferably about $10^2$ to about $10^3$ ohm cm, and a dielectric layer formed from a composition comprising a dielectric layer forming material and a conductive filler in the form of nanoparticles and having a volume resistivity of less than about $10^4$ ohm cm, preferably about $10^2$ to about $10^3$ ohm cm.

The sixth aspect of the present invention is directed to a method for improving the performance of an electrophoretic display by incorporating non-light-absorbing conducting particles into a composition for the formation of display cells.

The electrophoretic display prepared from the present invention shows an increase in switching rate and image bistability even at low driving voltages without trade-off in display longevity and image uniformity. In addition, for the microcup-based electrophoretic displays, no detrimental effect on the embossing shim or the structure integrity of the resulting microcups is observed when the conductive nanoparticles are incorporated into the composition for the formation of the microcups. The reverse bias may also be reduced significantly without tradeoff in the image uniformity or switching performance.

Furthermore, by optimizing the electrical properties of the display cells, the process window for the roll-to-roll manufacturing is also widened, with high yields. This is possible because the requirement for the bottom thickness of the display cells is more relaxed.

DETAILED DESCRIPTION OF THE INVENTION

Definitions

Unless defined otherwise in this specification, all technical terms are used herein according to their conventional definitions as they are commonly used and understood by those of ordinary skill in the art.

While the term "microcup" is used to illustrate the specific embodiments of the present invention, it is understood that present invention is applicable to all types of electrophoretic display cells, including, but not limited to, the microcup-based display cells, the partition type display cells (see M. A. Hopper and V. Novotny, *IEEE Trans. Electr. Dev.*, 26(8): 1148-1152 (1979)), the microcapsule type display cells (U.S. Pat. Nos. 5,961,804 and 5,930,026) and the microchannel type display cells (U.S. Pat. No. 3,612,758).

While the term "primer layer" is referred to in the specific embodiments of the invention, it is also understood that the invention is applicable to not only the primer layer but also the sealing layer, adhesive layer, insulation layer, substrate layer and other comparable dielectric layers in an electrophoretic display.

The term "microcup" refers to the cup-like indentations which may be created by methods such as microembossing or a photolithographic process as described in the co-pending application, U.S. Ser. No. 09/518,488, the content of which is incorporated herein by reference in its entirely.

The term "Dmax" refers to the maximum achievable optical density of a display.

The term "Dmin" refers to the minimum achievable optical density of a display.

The term "contrast ratio" refers to the ratio of the reflectance (% of light reflected) of the Dmin state to the reflectance of the Dmax state.

General Description of the Microcup Technology

Figure 1A:
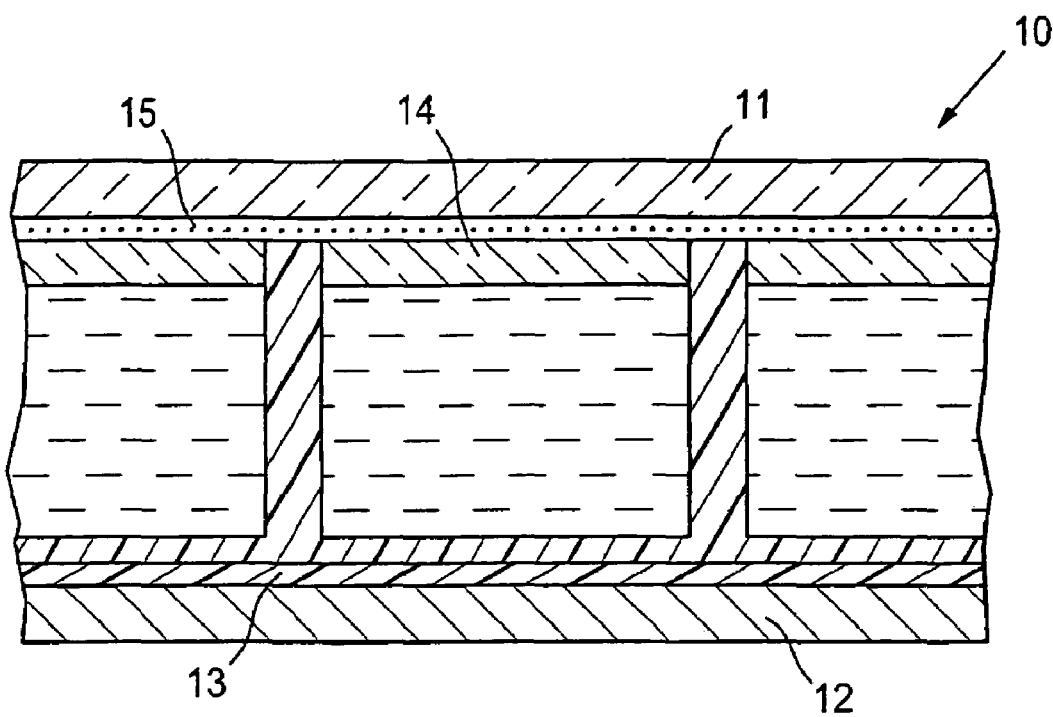
FIGS. 1A and 1B are schematic depiction of an electrophoretic display cell prepared by the microcup technology.
Figure 1B:
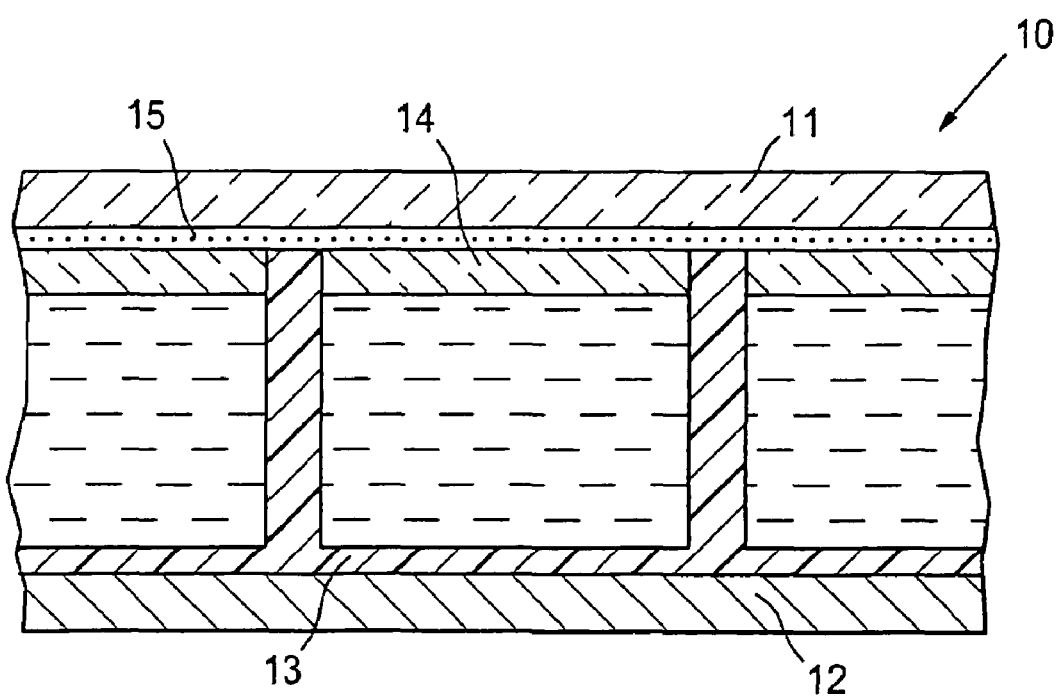
Figure 2:
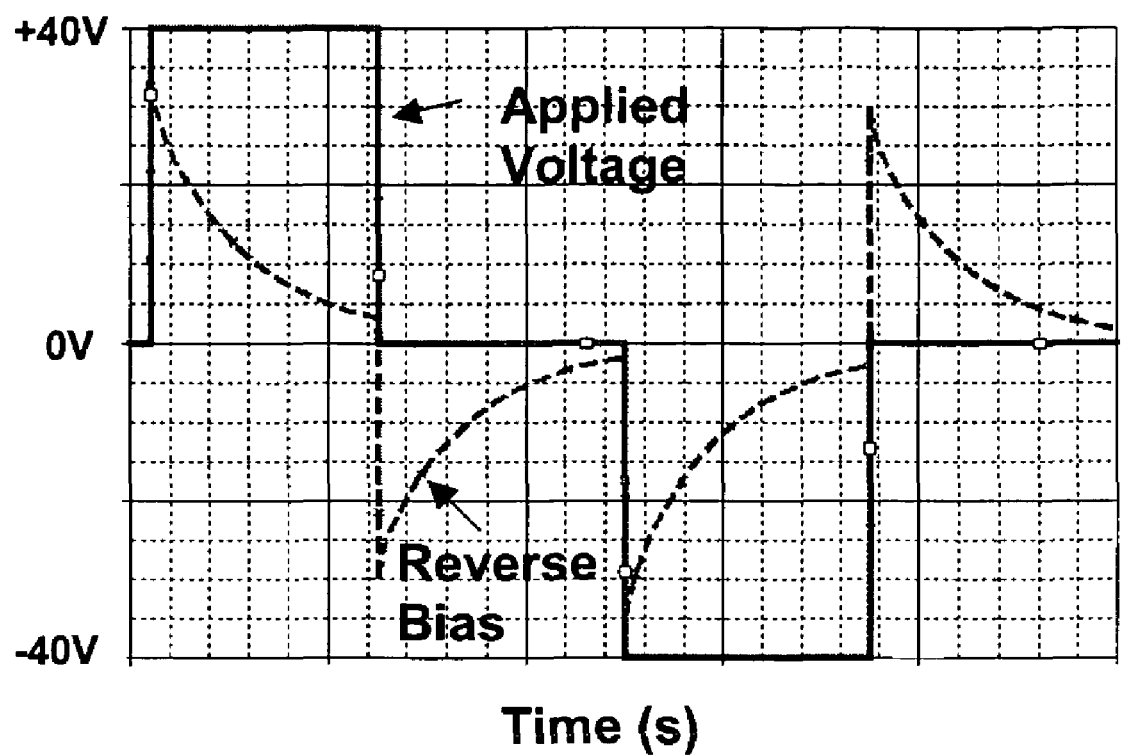
FIG. 2 illustrates the reverse bias phenomenon.

FIGS. 1A and 1B depict typical display cells prepared by the microcup technology as disclosed in WO01/67170. The microcup based display cell (10) is sandwiched between a first electrode layer (11) and a second electrode layer (12).

A thin layer (13) is optionally present between the cell (10) and the second electrode layer (12) as seen in the figures. The thin layer (13) may be a primer layer which is useful for improving the adhesion between the microcups and the second electrode layer (12). Alternatively the layer (13) may be a thin layer of the microcup material (as shown in FIG. 1B) if the microcup array is prepared by an embossing process.

The cell (10) is filled with an electrophoretic fluid and sealed with a sealing layer (14) on the open side of the microcups. The first electrode layer (11) is laminated onto the sealed cell, preferably with an adhesive (15).

In one embodiment, the microcup-based electrophoretic display may be viewed from the first electrode layer (11). In this case, the first electrode layer (11), the sealing layer (14) and the optional adhesive layer (15) must be transparent. In another embodiment, the microcup-based electrophoretic display may be viewed from the second electrode layer (12). In that case, the second electrode layer (12), the primer layer (13) and the microcup layer must be transparent.

In case of in-plane switching EPDs, one of the electrode layers (11 or 12) may be replaced by an insulating layer.

The display panel may be prepared by microembossing or photolithography as disclosed in WO01/67170. In the microembossing process, an embossable composition is coated onto the conductor side of the second electrode layer (12) and embossed under pressure to produce the microcup array. To improve the mold release property, the conductor layer may be pretreated with a thin primer layer (13) before coating the embossable composition.

The embossable composition may comprise a thermoplastic, thermoset or a precursor thereof, such as multifunctional vinyls including, but not limited to, acrylates, methacrylates, allyls, vinylbenzenes, vinylethers, multifunctional epoxides and oligomers or polymers containing crosslinkable functional groups. Multifunctional acrylate and oligomers thereof are the most preferred. A combination of a multifunctional epoxide and a multifunctional acrylate is also very useful to achieve desirable physico-mechanical properties. A low Tg binder or crosslinkable oligomer imparting flexibility, such as urethane acrylate or polyester acrylate, is usually also added to improve the flexure resistance of the embossed microcups. The composition may contain an oligomer, a monomer, additives and optionally a polymer. The Tg (glass transition temperature) for the embossable composition usually ranges from about −70° C. to about 150° C., preferably from about −20° C. to about 50° C.

The microembossing process is typically carried out at a temperature higher than the Tg. A heated male mold or a heated housing against which the mold presses may be used to control the microembossing temperature and pressure.

The mold is released during or after the embossable composition is hardened to reveal an array of microcups (10). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the embossable composition.

The composition of the primer layer, if present, is at least partially compatible with the embossing composition or the microcup material after curing. In practice, it may be the same as the embossable composition. Therefore the primer layer (13) of the display may be formed from a composition comprising a thermoplastic, thermoset or a precursor thereof, such as a multifunctional acrylate or methacrylate, a vinylbenzene, a vinylether, an epoxide or an oligomer or polymer containing crosslinkable functional groups. A multifunctional acrylate and oligomers thereof are usually preferred. The thickness of the primer layer is usually in the range of about 0.1 to about 5 microns, preferably about 0.1 to about 1 micron.

The microcups formed are filled with an electrophoretic fluid and sealed as disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference. Suitable sealing layer forming materials may include, but are not limited to, thermoplastic elastomers, polyvalent acrylate or methacrylate, cyanoacrylates, polyvalent vinyl including vinylbenzene, vinylsilane, vinylether, polyvalent epoxide, polyvalent isocyanate, polyvalent allyl and oligomers or polymers containing crosslinkable functional groups.

The sealed microcups finally are then laminated with the first electrode layer (11) which may be pre-coated With an adhesive layer (15). Suitable adhesive layer forming materials may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and oligomers, polymers or copolymers thereof. Adhesives comprising polymers or oligomers having a high acid or base content such as polymers or copolymers derived from acrylic acid, methacrylic acid, itaconic acid, maleic anhydride, vinylpyridine and derivatives thereof are particularly useful.

Embodiments of the Present Invention

The first aspect of the present invention is directed to a composition for the formation of display cells which composition comprises a display cell forming material and a conductive filler in the form of nanoparticles and having a volume resistivity of less than about $10^4$ ohm cm, preferably about $10^2$ to about $10^3$ ohm cm.

When the display cells are microcups, the composition may be an embossable composition and the display cell forming material may be a thermoplastic, thermoset or a precursor thereof as discussed in the section above and the thermoplastic, thermoset or a precursor thereof may have a volume resistivity in the range of $10^{12}$ to $10^{14}$ ohm cm.

The microcups formed have a desired volume resistivity in the range of about $10^7$ to $10^{10}$ ohm cm.

The term "nanoparticles", in the context of the present invention, refers to particles having an average primary particle size which is smaller than the range of UV-visible scattering light or a typical short range of surface roughness of a plastic film. More specifically, the average size of the primary conductive filler particles suitable for the present invention is in the range of about 5 to about 150 nanometer, preferably about 10 to about 50 nanometer and more preferably about 15 to about 20 nanometer. The conducting particles do not absorb light in the range of about 300 to about 700 nm.

Suitable conductive fillers may include, but are not limited to, conductive metal oxide particles, carbon black, graphite, carbon nanotube, conductive polymers such as polythiophene (PT), polyacetylene, polypyrrole (PPy) or polyaniline (PAN), metal particles or flakes such as silver particles or flakes and conductive nanoclusters such as Au or Cu nanoclusters. Specific examples of suitable conductive fillers may include zinc antimonate, zinc sulfide, indium tin oxide, antimony tin oxide and the like.

The conductive filler in the form of nanoparticles may be dispersed in a sol gel (which is a colloidal dispersion of the nanoparticles). In this case, the sol gel may comprise a solvent compatible with the embossable composition. For example, the solvent may be 2-butanone, acetone, isopropanol or the like. The concentration of the conductive filler in the sol gel may be in the range of about 15% to about 45%, preferably in the range of about 30% to about 40%.

The composition may be prepared by gradually adding the conductive filler in the form of nanoparticles into an embossable composition under strong stirring for an appropriate period of time until the composition is homogeneously blended. The length of the time depends on the stirring conditions. The conductive filler may be added in a dried form or in the form of a sol gel as described above.

The conductive filler preferably is colorless and highly transparent. For example, it should have about 75% to about 95%, preferably about 85% to about 90%, transmission in the visible light range for a 20 μm dried film containing about 30% by weight of the conductive filler.

In one embodiment, the conductive filler is Celnax® (from Nissan Chemical) which is zinc antimonate colloidal nanoparticles.

The concentration of the conductive filler (calculated on the basis of the dried form) in the embossable composition may range from about 0.01% to about 50%, preferably from about 15% to about 45%, by weight of the total solid content.

Additives such as dispersion agents, surfactants, thickeners, crosslinking agents or vulcanizers may also be added to improve the coating quality and display performance.

The second aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into a composition for the formation of display cells.

When the display cells are microcups, the composition may be an embossable composition which comprises a microcup forming material such as a thermoplastic, thermoset or a precursor thereof. All features of the first aspect of the invention are applicable to the composition.

The third aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into both a composition for the formation of display cells and a composition for the formation of a dielectric layer.

When the display cells are microcups, the composition may be an embossable composition as discussed above. The dielectric layer may be a primer layer and the primer layer composition may comprise a primer layer forming material as discussed above and a conductive filler in the form of nanoparticles and having a volume resistivity of less than about $10^4$ ohm cm, preferably about $10^2$ to about $10^3$ ohm cm. The resulting primer layer may have a desired volume resistivity in the range of about $10^7$ to $10^{10}$ ohm cm.

The conductive filler materials and concentrations suitable for the microcup embossable composition are also suitable for the primer layer composition. The filler material used in the microcup composition and/or primer layer composition should not interfere with the hardening (such as UV curing) of the layer(s) or mold release in the microembossing process.

The primer layer forming material may be the thermoplastic, thermoset or a precursor thereof as discussed above and it may have a volume resistivity in the range of $10^{12}$ to $10^{14}$ ohm cm.

This third aspect of the invention constitutes one of the preferred embodiments of the invention. In such a case, an almost total elimination of the reverse bias is possible, thus maintaining the bistability of the display.

The fourth aspect of the present invention is directed to an electrophoretic display which comprises display cells formed from a composition comprising a display cell forming material and a conductive filler in the form of nanoparticles and having a volume resistivity of less than about $10^4$ ohm cm, preferably about $10^2$ to about $10^3$ ohm cm.

The fifth aspect of the present invention is directed to an electrophoretic display which comprises display cells formed from a composition comprising a display cell forming material and a conductive filler in the form of nanoparticles and having a volume resistivity of less than about $10^4$ ohm cm, preferably about $10^2$ ohm cm, and a dielectric layer formed from a composition comprising a dielectric layer forming material and a conductive filler in the form of nanoparticles and having a volume resistivity of less than about $10^4$ ohm cm, preferably about $10^2$ to about $10^3$ ohm cm.

When the display cells are microcups as described above, the dielectric layer preferably is a primer layer.

In the present invention, even after the amount of conductive filler added has reached the electrical percolation threshold, the volume resistivity of the composition can still be controlled within the desired range. No crosstalk was observed between the neighboring pixels for a display matrix of 210 rows×210 columns with pixel size as small as 400 μm×400 μm.

EXAMPLES

The following examples are given to enable those skilled in the art to more clearly understand and to practice the present invention. They should not be considered as limiting the scope of the invention, but merely as being illustrative and representative thereof.

Preparation 1

Synthesis of a Reactive Protective Colloid $R_f$-Amine

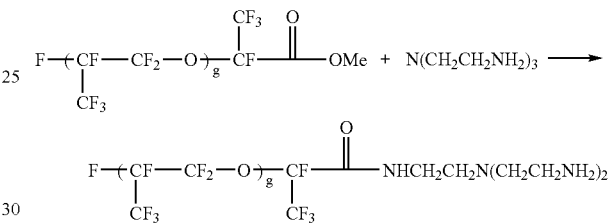

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for the methyl ester at 1780 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of the PFS2 solvent (perfluoropolyether from Solvay Solexis) and extracted with 20 ml of ethyl acetate three times, then dried to yield 17 gm of purified product ($R_f$-amine1900) which showed excellent solubility in HT200.

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure. $R_f$-amine350 was also prepared by the same procedure, except that the Krytox® methyl ester was replaced by $CF_3CF_2CF_2COOCH_3$ (from SynQuest Labs, Alachua, Fla.).

Preparation 2

Preparation of Electrophoretic Fluid 8.93 Gm of Desmodur® N3400 aliphatic polyisocyanate (from Bayer AG) was dissolved in 4.75 gm of acetone (99.9%, from Burdick & Jackson) and homogenized for 10 seconds with a rotor-stator homogenizer (IKA ULTRA-TUR- RAX T25, IKA WORKS) at ambient temperature. To the resultant solution, 13.61 gm of $TiO_2$ (R706, from DuPont) was added and homogenized for 2 minutes. To the resultant $TiO_2$ dispersion, a solution containing 1.42 gm of 1,5-pentanediol (BASF), 0.30 gm of triethanolamine (99%, Dow), 2.75 gm of polypropylene oxide (MW=725, from Aldrich) and 1.25 gm of acetone was added and homogenized for 30 seconds. 0.37 Gm of a 2% dibutyltin dilaurate (Aldrich) solution in acetone was then added and homogenized for 1 minute and 30 seconds. In the final step, 50.0 gm of HT-200 (Solvay Solexis) containing 2.25 gm of $R_f$-amine4900 (prepared according to Preparation 1 above) was added and homogenized for 4 minutes. The resultant microparticle dispersion was then heated at 80° C. overnight and stirred under low shear to post cure the microparticles.

An electrophoretic dispersion was prepared by adding 10% by weight of thus prepared microencapsulated $TiO_2$ particles and 3.3% by weight of a black dye in HT-200.

Preparation 3

Preparation of a Primer Layer Coated Conductor Film

A primer coating solution containing 1.42 gm of Irostic 9815 (polyester polyurethane, Huntsman, Utah, 2.21 gm of CN983 (urethane acrylate, Sartomer, Exton, Pa.), 1.10 gm of EB1290 (urethane acrylate, UCB, Smyrna, Ga.), 0.13 gm of Irgacure™ 369 ([(2-benzyl-2-(dimethylamino)-1-[4-(4-morphol inyl)phenyl]-1-butanone), Ciba, Tarrytown, N.Y.), 0.13 gm of Sarcure SR1124 (ITX, Sartomer, Exton, Pa.), 0.03 gm of Irganox™ 1035 ((thiodiethylene bis(3,5-di(tert)-butyl-4-hydroxyhydrocinnamate), Ciba Tarrytown, N.Y.), 80 gm of MEK (methyl ethyl ketone) and 15 gm of CHO (cyclohexanone) was mixed thoroughly and coated onto a 5 mil transparent conductor film (ITO/PET film, 5 mil OC50 from CPFilms, Martinsville, Va.) using a T#4 drawdown bar. The coated ITO film was dried in an oven at 65° C. for 10 minutes, and then exposed to 1.4 $J/cm^2$ of UV light (Fusion UV, D bulb) under air using a UV conveyer (DDU, Los Angles, Calif.).

Preparation 4

Preparation of Electrophoretic Display Sample

Preparation 4A: Preparation of Microcups 35.48 gm of EB 600™ (acrylated Epoxy Oligomer, UCB, Smyrna, Ga.), 46.12 gm of SR 399™ (penta-functional acrylic monomer, Sartomer, Exton, Pa.), 9.36 gm of EB1360™ (UV/EB curable slip agent, UCB, Smyrna, Ga.), 6.41 gram of SR610 (polyethylene glycol 600 diacrylate, Sartomer, Exton, Pa.), 0.13 gm of Irgacure™ 819 (bis(2,4,6-trimethylbenzoyl)-phenylphosphineoxide, Ciba, Tarrytown, N.Y.), 2.0 gm of Irgacure™ 184 (1-hydroxy-cyclohexyl-phenyl-ketone, Ciba, Tarrytown, N.Y.) and 0.05 gm of Irganox™ 1035 (thiodiethylene bis(3,5-di(tert)-butyl-4-hydroxyhdrocinnamate, Ciba, Tarrytown, N.Y.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto an 8"×8" electroformed Ni male mold for an array of 90 µm (length)×90 µm (width)×27 µm (depth)×11 µm (width of top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 3, with the primer layer facing the Ni mold using a Hot Roll Laminator (ChemInstrument, Fairfield, Ohio) preset at a roller temperature of 200° F., lamination speed of 1 cm/sec and the roll pressure is 80 psi. An UV filter glass, ¼" thick HOYAL-42, was then placed atop. A UV curing station (Oriel Instruments, Stratford, Conn.) with UVA intensity of 1.2 $mw/cm^2$ was used to cure the panel for 5.5 seconds. The ITO/PET film was then peeled away from the Ni mold at a peeling angle of about 30 degree to give a 8"×8" microcup array on ITO/PET. An acceptable release of the microcup array from the mold was observed. The thus obtained microcup array was further post-cured with a UV conveyor curing system (DDU, Los Angles, Calif.) with a UV dosage of 2.8 $J/cm^2$.

Preparation 4B: Filling and Sealing the Microcups

An electrophoretic fluid prepared from Preparation 2 was filled into the microcups prepared from Preparation 4A using a #0 drawdown bar. The filled microcups were then overcoated with a top-sealing/adhesive solution consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl]2-morpholinopropan-1-one), 40.8 parts by weight of MEK, 40.8 parts by weight of IPAc and 4.3 parts by weight of CHO (cyclohexanone) with a doctor blade. The sealing layer was air-dried for 1 minute and heated in an 80° C. oven for 2 minutes to form a seamless sealing on the filled microcups. The top-sealed microcups were laminated directly onto a 5 mil ITO/PET film by a laminator at 120° C. at a linear speed of 20 cm/min. After lamination, the sample was further UV cured by passing through a UV conveyer twice at the speed of 10 ft/min with a UV intensity of 2.56 $W/cm^2$ (which is equivalent to 0.856 $J/cm^2$).

Example 1

Comparative Example without Zinc Antimonate

An EPD sample was prepared according to Preparation 4 with the electrophoretic fluid prepared from Preparation 2 and the primer layer of Preparation 3 was used in this example. There was no CELNAX® added in either the microcup composition or the primer layer composition.

The electro-optic response of the sample was measured by bringing an incoming light from an optical fiber cable connected to a light source and illuminating on the display cell. The reflecting light from the display sample was then collected and converted into electrical signal by a photo-electric detector and finally recorded and displayed on an oscilloscope. The results are summarized in Table 1.

Example 2

30% Zinc Antimonate in Microcup and 0% Zinc Antimonate in Primer Layer

The procedure of Comparative Example 1 was followed except that CELNAX® (from Nissan Chemical) equivalent to 30% by weight of dry zinc antimonate was added into the microcup composition. There was no CELNAX® in the primer layer. The electro-optical response was measured according to the procedure of Example 1 and the results are summarized in Table 1. The results show that Example 2 (with the addition of CELNAX® to the microcup composition) had less image reflectance loss due to reverse bias and better image bistability than that of Example 1 (without addition of CELNAX® to the microcup composition), while the switching rate was about the same.

Example 3

30% Zinc Antimonate in Microcup and 45% Zinc Antimonate in Primer Layer

The same procedure of Comparative Example 1 was followed except that CELNAX® equivalent to 30% by weight of zinc antimonate was added to the microcup composition and CELNAX® equivalent to 45% by weight of zinc antimonate was added to the primer layer composition. The electro-optical response was measured according to the procedure of Example 1 and the results are summarized in Table 1. The results show that Example 3 (with the addition of CELNAX® to the microcup composition and to the primer layer) gave faster switching rate and eliminated the image reflectance loss due to reverse bias and significantly improved the image bistability as compared to Example 1 (without addition of CELNAX® to either the microcup or primer layer composition).

TABLE 1

Comparison of Electro-optic Performance of Examples 1-3

| Example No. | Switching Time (ms) | % of Image Reflectance Loss due to Reverse Bias | Bistability (% of Reflectance Loss after Power Off) |
| --- | --- | --- | --- |
| 1 | 320 | 47% | 28% |
| 2 | 330 | 19% | 13% |
| 3 | 280 | 0% | 2% |

While the present invention has been described with reference to the specific embodiments thereof, it should be understood that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for improving the performance of an electrophoretic display which method comprises
    a) forming microcups with a composition comprising a conductive filler in the form of nanoparticles and having a volume resistivity of less than about $10^4$ ohm cm; and
    b) filling the formed microcups with an electrophoretic fluid which comprises charged pigment particles dispersed in a solvent.
2. The method of claim 1 wherein said volume resistivity is about $10^2$ to about $10^3$ ohm cm.

3. The method of claim 1 wherein the conductive filler has an average primary particle size in the range of about 5 to about 150 nanometer.
4. The method of claim 1 wherein the conductive filler is selected from the group consisting of conductive metal oxide particles, carbon black, graphite, carbon nanotube, conductive polymers, metal particles or flakes and conductive nano clusters.
5. The method of claim 4 wherein said conductive polymer is polythiophene, polyacetylene, polypyrrole, or polyaniline.
6. The method of claim 4 wherein metal particles or flakes are silver particles or flakes.
7. The method of claim 4 wherein conductive nano clusters are Au or Cu nanoclusters.
8. The method of claim 1 wherein said conductive filler is zinc antimonate, zinc sulfide, indium tin oxide or antimony tin oxide.
9. An electrophoretic display which comprises
    a) microcups formed from a composition comprising a microcup forming material and a conductive filler in the form of nanoparticles and having a volume resistivity of less than about $10^4$ ohm cm; and
    b) an electrophoretic fluid filled in the microcups wherein said electrophoretic fluid comprises charged pigment particles dispersed in a solvent.
10. The display of claim 9 wherein the volume resistivity is about $10^2$ to about $10^3$ ohm cm.
11. The display of claim 9 wherein the conductive filler has an average primary particle size is in the range of about 5 to about 150 nanometer.
12. The display of claim 9 wherein the conductive filler is selected from the group consisting of conductive metal oxide particles, carbon black, graphite, carbon nanotube, conductive polymers, metal particles or flakes, and conductive nano clusters.
13. The display of claim 12 wherein said conductive polymer is polythiophene, polyacetylene, polypyrrole, or polyaniline.
14. The display of claim 12 wherein metal particles or flakes are silver particles or flakes.
15. The display of claim 12 wherein conductive nanoclusters are Au or Cu nanoclusters.
16. The display of claim 9 wherein said conductive filler is zinc antimonate, zinc sulfide, indium tin oxide, or antimony tin oxide.
17. The method of claim 1 further comprising forming a primer layer with a composition comprising the conductive filler in the form of nanoparticles and having a volume resistivity of less than about $10^4$ ohm cm.
18. The display of claim 9 further comprising a primer layer formed from a composition comprising a primer layer forming material and the conductive filler in the form of nanoparticles and having a volume resistivity of less than about $10^4$ ohm cm.

* * * * *